UNITED STATES PATENT OFFICE 2,684,915

ETHYL CELLULOSE AEROSOL LACQUER

John S. Tinsley, Wilmington, Del., assignor to Hercules Powder Company, Wilmington, Del., a corporation of Delaware No Drawing. Application December 28, 1950, Serial No. 203,201

3 Claims. (Cl. 106—173)

This invention relates to ethyl cellulose coating compositions and more particularly to ethyl cellulose coating compositions having a pressure-generating solvent as an atomizing or spraying aid.

Coating compositions sprayable by self-generated pressure, wherein alkyl halides having high vapor pressure at room temperature comprise the solvent, are known in the art. Such compositions are referred to as aerosol compositions. Cellulose acetate and nitrocellulose have been suggested in coating compositions of this type but have not met with success. Such compositions are not soluble in propellent solvents in the concentrations required for a satisfactory sprayable lacquer.

The essential qualities of a satisfactory sprayable aerosol lacquer are in general those of any sprayable lacquer but with the essential difference that the pressure-generating solvent, which volatilizes rapidly, is present as a major component of the solvent before spraying and is substantially all evaporated by the time the sprayed coating is laid down. Nitrocellulose and cellulose acetate compositions have not been satisfactory because of their poor miscibility with propellent solvent under the wide range of concentrations involved. Clogging of the valves of spray containers and uneven coating of the films have been attributed to these difficulties.

Now in accordance with this invention, it has been found that highly satisfactory aerosol lacquers free of the above-outlined disadvantages of nitrocellulose and cellulose acetate compositions are provided by a composition containing 20–40% ethyl cellulose lacquer and a complement of a pressure-generating solvent consisting of 30–70% dichlorodifluoromethane and a complement of 1,1,1 - trichloromonofluoroethane, said lacquer consisting of 10–25% solids and a complement of lacquer solvent, said solids consisting of 0–50% lacquer solvent-insoluble pigment and a complement of a film-forming composition consisting of 50–70% ethyl cellulose having a degree of substitution (D. S ) within the range of 2.3 to 2.7, and a complement of ethyl cellulose compatible plasticizer resin, and said lacquer solvent consisting of 55–85% hydrocarbon solvent of the group consisting of xylene and mixtures of xylene and toluene in which the toluene does not exceed 35% of the xylene, and a complement of an alcohol of the group consisting of isopropyl alcohol and mixtures of isopropyl alcohol and ethyl alcohol in which the ethyl alcohol does not exceed 50% of the isopropyl alcohol.

Examples showing specific compositions within the scope of this invention are tabulated below. In all instances percentages are by weight and amounts are parts by weight.

| Example | I | II | III | IV | V | VI | VII | VIII |
|---|---|---|---|---|---|---|---|---|
| Ethyl cellulose (D. S. 2.5–2.6) | 8.4 | 7.2 | 10.8 | 7.2 | 7.2 | 7.2 | 7.2 | 7.5 |
| Ethyl cellulose compatible resin: | | | | | | | | |
| Ethylene glycol ester of monohydroabietyl maleate | 2.8 | 2.4 | 3.6 | | 2.4 | 2.4 | 2.4 | 2.5 |
| Maleated pentaerythritol ester of rosin | | | | 4.8 | | | | |
| Glycerol ester of rosin and terpene-maleic anhydride condensate | 2.8 | 2.4 | 3.6 | | 2.4 | 2.4 | 2.4 | 2.08 |
| Octyl phenol | | | | | | | | 0.42 |
| Pigment: | | | | | | | | |
| Chrome yellow | 6.0 | | | | | | | |
| Red iron oxide | | 8.0 | | | 8.0 | | 8.0 | |
| Titanium dioxide | | | 12.0 | | | | | |
| Chrome green | | | | 8.0 | | | | |
| Xylene | 60.9 | 56.4 | 44.7 | 47.2 | 56.4 | 56.4 | 56.4 | 70.0 |
| Toluene | 3.0 | 7.6 | 11.3 | 16.8 | 7.6 | 7.6 | 7.6 | |
| Isopropanol | 15.2 | 14.1 | 11.2 | 11.8 | 14.1 | 14.1 | 14.1 | 17.5 |
| Ethanol | 0.8 | 1.9 | 2.8 | 4.2 | 1.9 | 1.9 | 1.9 | |
| Dichlorodifluoromethane, 50% 1,1,1-Trichloromonofluoroethane, 50% | 150 | 150 | 150 | 150 | 160 | 150 | 175 | 400 |

The compositions are essentially lacquers to which a propellent solvent mixture of dichlorodifluoromethane and 1,1,1 - trichloromonofluoroethane is added. They are made by first producing the lacquer in the usual manner and then diluting with the propellent solvent gradually so as to avoid precipitation.

The ethyl cellulose used in the compositions will have a degree of substitution (D. S.) within the range of about 2.3–2.7. Within this range the ethyl cellulose solubility in the propellant is sufficient to provide good spraying characteristics without precipitation. The preferred range of ethoxyl for properly balancing of the properties with respect to viscosity, flowability, and solubility is in the range of about 2.5–2.6 D. S. The ethyl cellulose will comprise 50–70%, preferably about 50%, of the soluble solids in the lacquer.

The ethyl cellulose compatible resin is any one or a mixture of resins known in the art to be compatible with ethyl cellulose. A tabulation of such esters is given in "Hercules Ethyl Cellulose—Properties and Uses" published by Hercules Powder Company (1949). Included among the resins are congo, Batu, rosin, mastic gum, alkyd resins, coumarone indene resins, phenol formalde resins, rosin esters of mono- and poly-hydric alcohols and the like The resins may also be substituted in whole or in part by plasticizers. The melting point of the resins is thus not critical, although the melting point will determine somewhat the characteristics of the coating produced by the lacquer. A soft resin will thus produce a softer film than will a hard resin. A liquid plasticizer used in place of the resin will, in the extreme, produce a soft film which will not be print-free unless the minimum amount of plasticizer is used. Such films have special uses. The resin will be used in an amount within the range of about 30–50% of the soluble solids in the lacquer and the amount used will depend upon the properties desired in the resultant film. They are selected in type and amount in accordance with the quality which it is desired to impart into the film. The selection of the desired resin is commonplace with those skilled in the art.

Pigments may be used or omitted from the lacquer compositions. Since they have little or no effect on the viscosity, they do not affect the sprayability when used in amounts up to about 50% of the total solids in the lacquer. This will be from 2–12% of the lacquer before adding the propellant, depending on the pigment used. The pigments may be any neutral-acting water-insoluble inorganic coloring matter insoluble in the lacquer solvents such as those known and used in the lacquer art. This includes such pigments as chrome yellow, chrome green, iron oxides, titanium dioxide, cadmium red, carbon black, ultramarine blue, and the like. The pigments of high density have a greater tendency to settle out on standing than those of low density, and, because of this settling, provision for agitation is preferably provided. A common practice is the addition of a marble or porcelain ball to the container to aid in pigment dispersion prior to use.

The solvent mixture which evaporates slowly relative to the propellant is highly important in the compositions of this invention. When the lacquer is sprayed, the cooling as a result of rapid evaporation of the propellant has been found to require proper compounding to maintain good flowout of the lacquer film and also to maintain good gloss in spite of moisture condensation from the air. For this reason, the solvent mixture is critical as to components and composition in that the solubility of the lacquer is to be maintained and the evaporation rate of the solvent is to be such as is required to avoid precipitation of the ethyl cellulose or other components during the spraying operation, and in that the lacquer should not develop a permanent blush due to condensed water vapor. The mixture of xylene and isopropyl alcohol has been found to give the desired gradual evaporation rate. The xylene may also be admixed with toluene in an amount up to 35% of the weight of the toluene. The isopropyl alcohol may be admixed with ethyl alcohol in an amount up to 50% of the isopropyl alcohol. The alcohols prevent permanent blush and are preferably anhydrous in the lacquer composition. This aids in the stability of the aerosol lacquer composition before, during, and after spraying. The solvent composition has also been found to permit a high dilution with the propellant without precipitation of the lacquer components. The solvent composition has thus been found to be critical for the compositions of this invention. The amount of total hydrocarbon in the alcohol-hydrocarbon lacquer solvent must be about 55–85% to provide the most suitable solubility and viscosity.

The propellent solvent is a mixture of dichlorodifluoromethane and trichloromonofluoroethane which has been found to have the highest solvent power for the ethyl cellulose and resins in the lacquer composition. The ratio of the propellent solvents in the propellent mixture is limited to a maximum of 4:1 for either of the chlorinated fluorinated hydrocarbons. Thus a mixture consisting of the two chlorinated fluorinated hydrocarbons in which 30–70% is dichlorodifluoromethane is satisfactory. The preferred composition contains about 50% each of dichlorodifluoromethane and trichloromonofluoroethane.

The amount of propellent solvent of the composition set forth used in the lacquer composition is about 60–80% of total spray composition, and the composition as it has been developed permits a variation in the amount of this propellent solvent that can be tolerated within this range depending on the amount of ethyl cellulose and its D. S. Compositions having below about 60% propellent solvent have a tendency to be too viscous for trouble-free application, while those having substantially more than 80% dichlorodifluoromethane tend to precipitate ethyl cellulose too readily, particularly in the presence of small amounts of water, such as the amount that is introduced when the ethanol is 95% alcohol.

The lacquers of this invention are particularly successful for use in the so-called "aerosol bomb" type of container with a thumb-actuated spraying valve.

What I claim and desire to protect by Letters Patent is:

1. An aerosol lacquer of the pressure-generating solvent type containing 20–30% lacquer and a complement of a pressure-generating solvent consisting of about 50% dichlorodifluoromethane and a complement of 1,1,1-trichloromonofluoroethane, said lacquer consisting of 10–25% solids and a complement of lacquer solvent, said solids consisting of a film-forming composition consisting of 50–70% ethyl cellulose having a D. S. within the range of 2.3–2.7, and a complement of ethyl cellulose compatible plasticizing resins, and said lacquer solvent consisting of 55–85% hydrocarbon solvent of the group consisting of xylene and mixtures of xylene and toluene in which the toluene does not exceed 35% of the xylene, and a complement of an alcohol of the group consisting of isopropyl alcohol and mixtures of isopropyl alcohol and ethyl alcohol in which the ethyl alcohol does not exceed 50% of the isopropyl alcohol.

2. An aerosol lacquer of the pressure-generating solvent type containing 20–30% lacquer and a complement of a pressure-generating solvent consisting of about 50% dichlorodifluoromethane and a complement of 1,1,1-trichloromonofluoroethane, said lacquer consisting of 10–25% solids and a complement of lacquer solvent, said solids consisting of 50–70% ethyl cellulose having a D. S. in the range of 2.5–2.6 and a complement of ethyl cellulose compatible plasticizing resins, and said lacquer solvent consisting of 55–85% hydrocarbon solvent of the group consisting of xylene and mixtures of xylene and toluene in which the toluene does not exceed 35% of the xylene, and a complement of an alcohol of the group consisting of isopropyl alcohol and mixtures of isopropyl alcohol and ethyl alcohol in which the ethyl alcohol does not exceed 50% of the isopropyl alcohol.

3. An aerosol lacquer of the pressure-generating solvent type containing 20–30% lacquer and a complement of a pressure-generating solvent consisting of about 50% dichlorodifluoromethane and a complement of 1,1,1-trichloromonofluoroethane, said lacquer consisting of 10–25% solids and a complement of lacquer solvent, said solids consisting of about 50% ethyl cellulose having a D. S. in the range of 2.5–2.6 and a complement of ethyl cellulose compatible plasticizing resins, and said lacquer solvent consisting of about 80% xylene and about 20% isopropyl alcohol.

References Cited in the file of this patent

UNITED STATES PATENTS

| Number | Name | Date |
|---|---|---|
| 1,884,619 | Dreyfus | Oct. 25, 1932 |
| 2,003,655 | Reid | June 4, 1935 |
| 2,056,787 | Henne | Oct. 6, 1936 |
| 2,098,539 | Charch | Nov. 9, 1937 |
| 2,142,668 | Bucy | Jan. 3, 1939 |
| 2,381,753 | Irion | Aug. 7, 1945 |

OTHER REFERENCES

"Ethyl Cellulose Properties and Uses" (1949), Hercules Powder Company, Wilmington, Del., pages 17, 18, 19, 29 and 30.